Figure 1:
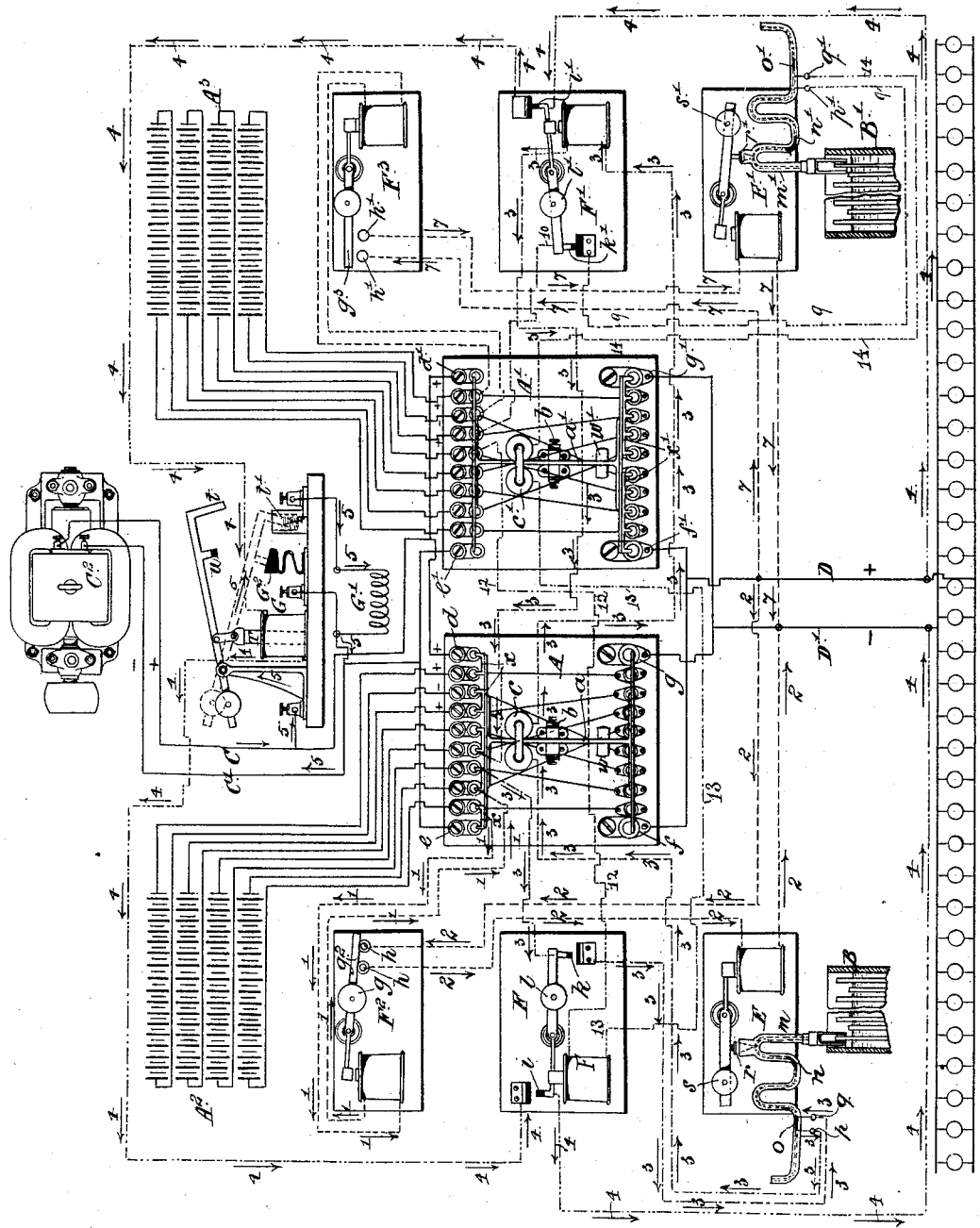

(No Model.) 2 Sheets—Sheet 1.

F. KING.
ELECTRICAL DISTRIBUTION AND CHARGE OF SECONDARY BATTERIES.

No. 371,893. Patented Oct. 18, 1887.

(No Model.) 2 Sheets—Sheet 2.
F. KING.
ELECTRICAL DISTRIBUTION AND CHARGE OF SECONDARY BATTERIES.
No. 371,893. Patented Oct. 18, 1887.
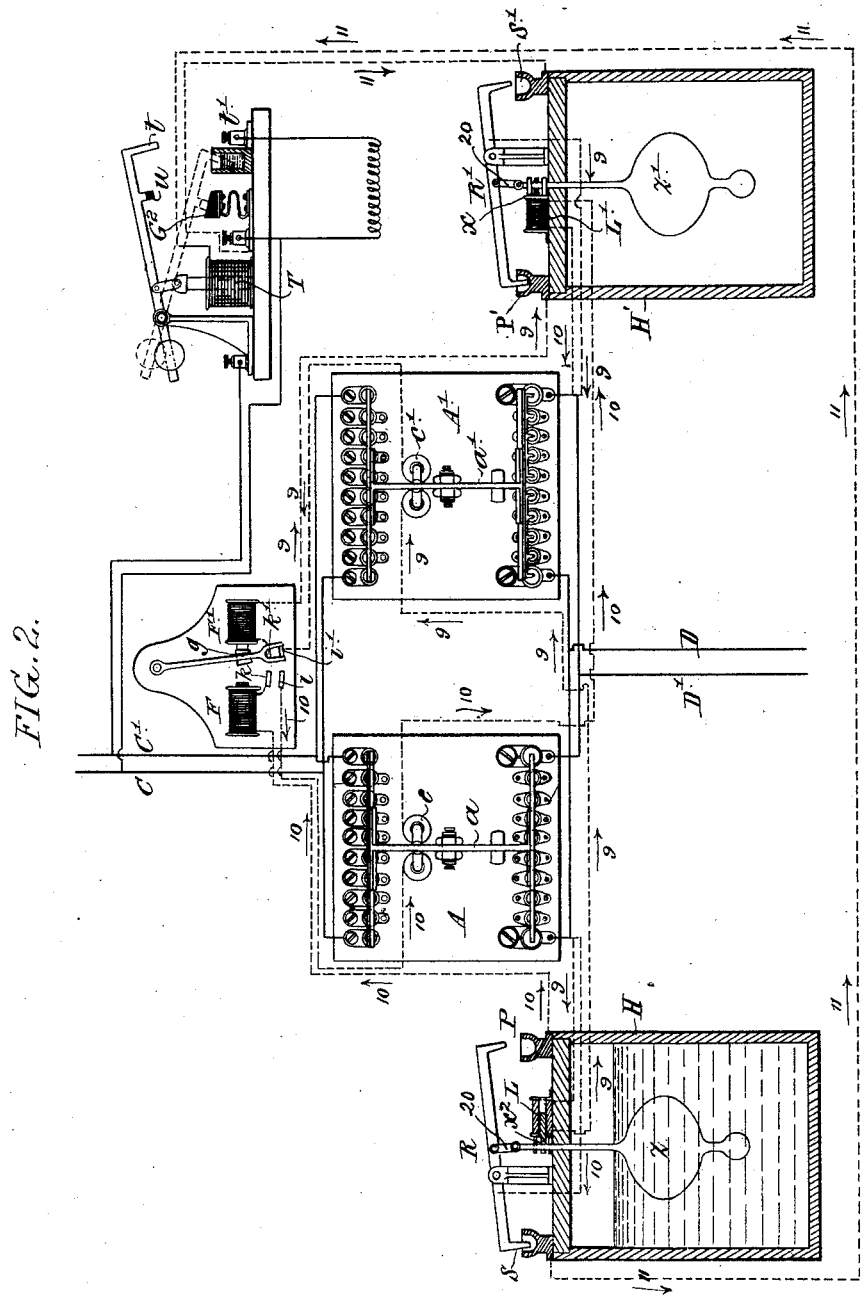
Witnesses:
William D. Conner.
David S. Williams.
Inventor:
Frank King
by his Attorneys
Howson & Son

UNITED STATES PATENT OFFICE.

FRANK KING, OF FULHAM, COUNTY OF MIDDLESEX, ENGLAND.

ELECTRICAL DISTRIBUTION AND CHARGE OF SECONDARY BATTERIES.

SPECIFICATION forming part of Letters Patent No. 371,893, dated October 18, 1887.

Application filed March 15, 1887. Serial No. 231,003. (No model.) Patented in England April 2, 1886, No. 4,662.

*To all whom it may concern:*

Be it known that I, FRANK KING, electrical engineer, a subject of the Queen of Great Britain and Ireland, and residing at 38 Chesilton Road, Fulham, in the county of Middlesex, England, have invented certain new and useful Improvements in the Automatic Electrical Distribution from and Charge of Secondary Batteries, (for which I have applied for a patent in Great Britain on the 2d April, 1886, No. 4,662,) of which the following is a specification.

My invention relates to a combination of apparatus and circuits whereby the charge and discharge of secondary batteries are automatically accomplished at the proper times without interruption of the charging or discharging circuits, and whereby the charging-current may be of high tension, as it is prevented from reaching the distributing-mains, a constant supply of electricity being maintained in such mains.

In carrying out my invention two batteries or sets of batteries are employed, each battery or set being provided with switching mechanism for transferring it from the charging to the distributing main, or vice versa. These switches are operated automatically, the circuits of their controlling-magnets being opened and closed by the action of devices operated by the batteries themselves when the maximum point of charge or exhaustion is reached. The device used for this purpose is termed a "charge-indicator," two forms of which are hereinafter described. In one case the contacts of the switch-magnet's circuit are operated by the pressure of the gases evolved when the battery is charged to its full capacity, this pressure being utilized to displace a globule of mercury in a tube connected with the battery-cell, and thereby break the circuit of the switch-magnet. To restore the globule of mercury a valve in the gas-tube is opened by an electro-magnet whose circuit is closed by a galvanometer or potential indicator, the magnet of the latter being included in circuit with one of the batteries. In another case the contacts are operated by a bulb or float in the electrolytic liquid of one of the cells, which rises or falls as the specific gravity of the liquid becomes greater or less.

Means are adopted to prevent one set of batteries connecting itself with the charging-circuit before the other is disconnected therefrom, so that one set of batteries is always connected with the distributing-circuit. The means for this purpose, hereinafter described, consist of relays, one for each set of batteries, the armature-lever of each relay controlling contacts in the circuit of its own switch-magnet, while its own magnet, which operates the armature-lever, is included in the circuit of the other switch-magnet. Both sets of batteries may, however, be simultaneously connected with the distributing-circuit. In such case means are provided for closing the charging-circuit first through a resistance to prevent dangerous sparking, the resistance being afterward short-circuited.

In order that my invention may be clearly understood, I will explain, with reference to the accompanying drawings, means whereby the same may be carried into practical effect. I premise, however, that I do not limit myself to the precise details which I have illustrated, as they may be varied without departing from the nature of my invention.

Figure 1 of the accompanying drawings represents diagrammatically one combination or arrangement of apparatus and circuits according to my invention, which I will describe as applied to two sets of batteries, from which its general application will be understood. Fig. 2 illustrates a modification, as hereinafter explained.

Referring to Fig. 1, A A' are oscillating or rocking switches, each electrically connected to a separate set of batteries, one cell of each of the sets of batteries being also shown at B and B' for the more clear delineation of the circuits. The oscillating or rocking lever of each of the switches is fitted to turn on pivots $b$, and is operated by an electro-magnet, $c$, and a counter-weight at $w$, so as to make contacts to complete the circuit alternately with the charging and the discharging mains, as hereinafter described. The charging-main C C' and the discharging-main D D' are connected to the oscillating or rocking switches A A', as shown, the positive lead from the dynamo-electric machine $C^2$ being connected to the two switches A A' at $d$ $d'$, respectively, and the negative lead of the said charging-main being connected to the said switches at $e$ $e'$, while the positive lead of the discharging-main is connected with the said switches A A', respectively, at $f f'$, and the negative lead of the said discharging-main is connected to the said switches at $g g'$, respectively.

The mode of connecting the rocking switches with the batteries is as follows: The said switches are provided each with a series of mercury-cups, (or other suitable form of contacts,) to which the terminals of the several batteries $A^2 A^3$ are connected. The contacts for the positive and negative terminals of the batteries on one side of the switch are arranged alternately, as indicated, and a bridge, $x$, of copper or other suitable conducting material, carried on one end of switch-lever $a$, when said lever is turned to charge the batteries, connects the positive end of the charging-main with the positive end of the first battery, while other similar bridges on the said end of the switch-lever connect the negative end of the said first battery with the positive end of the next battery, and so on through the series until the negative end of the charging-main is reached. The opposite end of the lever, at the discharging side of the switch, is also provided with similar bridge-pieces, as shown at $x'$, the contacts for the terminals being arranged so that all the positive terminals are side by side and all the negative terminals similarly arranged in line therewith and connected with the contacts on the charging side of the switch by the cross-wires, as shown.

E E' are gas-charge indicators for indicating when the batteries are fully charged, they being also employed to actuate contacts for completing and breaking the circuits which control the actuation of the oscillating or rocking switches A A'. In these circuits are arranged relay-magnets F F', the armatures of each of which are provided with two contact-pieces, $i k$ and $i' k'$, respectively, and a counterbalance-weight, $l l'$, respectively, for opening and closing the circuits through the electro-magnetic devices which actuate the rocking-levers of the switches A A'.

$F^2 F^3$ are potential indicators or galvanometers of high resistance inserted in the circuits of the batteries $A^2 A^3$, and G is a by-pass relay for connecting the leads of the charging-main through a resistance-coil, G', or through a carbon block, $G^2$, or both, to prevent dangerous sparking when the current is suddenly diverted.

I will now describe the combined apparatus, for which purpose let it be supposed that the set of batteries $A^2$ in connection with the oscillating or rocking switch A is discharging and the set of batteries $A^3$ in connection with the rocking switch A' is charging. Under these conditions the switch-levers $a$ and $a'$ will be in the position shown, and the positive current from the dynamo passing through the lead C will enter the switch A' at the point $d'$ and pass through the cells of the batteries $A^3$ in connection therewith, and thence by the lead C' back to the dynamo; or, instead of passing directly back to the dynamo, the current from the dynamo may, if desired, be made to pass through one or more other sets of batteries before returning to the dynamo. When the set of batteries $A^3$ in connection with the switch A' is fully charged, gas evolved from the battery plate or plates will enter the chamber of the cell B' and pass into the tube $m'$ of the gas-charge indicator E', and by its pressure will cause the mercury globules $n' o'$ to rise up the inclined portion of the said tube $m'$, the globule $o'$ moving out of contact with the contact-pieces $p' q'$, thereby breaking the circuit which had been exciting the electro-magnet $c'$ of the switch A', and also of the relay-magnet F. The circuit may be traced as follows: from contact $p'$ by wire 9 to contact $k'$, wire 10 to one pole of one of the batteries $A^3$, by wire 12 from the other pole thereof to coil of magnet F, by wire 13 to magnet $c'$, and thence by wire 14 back to contact $q'$. The switch-lever $a'$ will consequently fall over or rock on its pivots $b'$ under the action of its counterbalance-weight $w'$ and make the contacts to put the battery connected with the switch A' into circuit with the discharging-main D D'. The circuit through the relay-magnet F having also been broken, the armature thereof will be released, and will, by the counter-weight $l$, turn on its center and make contacts at $i$ and $k$. The potential in the discharging-batteries in connection with the switch A having previously decreased to the limit allowed, the current passing through the magnet of the potential indicator or galvanometer $F^2$, which, as clearly shown, is included in the circuit indicated by the arrows 1 with one of the set of batteries $A^2$, will not be sufficiently strong to attract the armature against the counter-balance $g$, which will consequently cause the contact end $g^2$ of the said armature to fall and make contact with the two contact-pieces $h$. A current will now pass from the positive lead D of the discharging-main, as shown by the arrows 2, through the contacts $h$ and $g^2$, to the magnet of the gas-charge indicator E and back to the negative lead D' of the discharging-main, thus completing a circuit, which will cause the armature of the gas-charge-indicator magnet E to be attracted against the weight of the counter-balance $s$ and raise a valve, $r$, from its seat in an opening in the tube $m$, so as to allow the gas contained in the said tube to escape, whereupon the mercury globules $n$ and $o$ in the tube $m$ will now fall by gravity into the position shown, and thus make contact with the contact-pieces $p$ and $q$. A current will then pass from the batteries $A^2$ in connection with the switch A through the contact $k$ of the relay-magnet F, which had fallen when the charge to the batteries connected to the switch A' was completed, as shown by the arrows 3, and through the contacts $q o p$ to the electro-magnet $c$ of the switch A, thereby attracting the lever $a$, causing it to turn on its pivots $b$, and bringing the batteries in connection therewith into the charging-main circuit, and the current passing on to the relay-magnet F', the armature thereof will be attracted and the contacts at $i'$ $k'$ thereby broken, the current passing thence back to the batteries to complete the circuit. The mercury globule $n$ is between the globule $o$, by which the circuit is closed, and the battery-cell, a cushion of air being between the two globules. The gases therefore do not come in contact with globule $o$, which it is desirable to avoid, as the gases may be explosive and likely to be ignited by the spark.

When the batteries $A^2$ in connection with the switch A are introduced into the charging-circuit, as above described, the electro-motive force at the potential indicator $F^2$ will rise, and its magnet will accordingly attract the armature thereof against the counterbalance-weight $g$, and the circuit 2 through the magnet of the gas-charge indicator E will be broken at $h$ $h$, whereupon the armature of the said magnet will by the weight $s$ close the valve in the tube $m$ in readiness for action in the evolution of gas from the battery plate or plates connected with the gas-charge indicator E. When the charge to the batteries $A^2$ in connection with the switch A is completed, the gas evolved from the plate or plates in the chamber B will enter the tube $m$, and by its pressure will force the mercury globule out of contact with the contact-pieces $p$ $q$, and thus break the circuit through the magnet in connection with the switch A, the lever of which switch will then, under the action of its counterbalance-weight, fall over and place the batteries in connection therewith again in the circuit of the discharging-mains D D'. If the electro-motive force from the batteries $A^3$, attached to the switch A', which have meanwhile been in the discharge-circuit, as described, has not fallen sufficiently to cause the magnet of the potential indicator $F^3$ to release its armature, so as to make contacts at $h'$ $h'$, the two sets of batteries will be together in the discharging-main. When this is the case, a current from the discharging-main will pass through the contact $i'$ of the relay-magnet F' (as indicated by the arrows 4) to the coil of the by-pass G, thereby attracting the armature T, bringing the end $t$ thereof into the mercury-cup $t'$, and by its continued movement also afterward bringing a contact-piece, $u$, into contact with a block, $G^2$, which connects the leads C and C' of the charging-mains first by a circuit through the resistance G', as shown by the arrows 5, and afterward through the short circuit past the resistance G', made by the carbon block $G^2$ and contact $u$, thereby preventing dangerous sparking and maintaining a constant circuit in the charging-leads. When the batteries $A^3$ in connection with the switch A' are discharging and exhausted to the predetermined limit, the electro-motive force will be insufficient to actuate the movable portion of the potential indicator or galvanometer $F^3$. The said movable portion or armature will consequently be released, and will make contact between the end $g^3$ thereof and the contacts $h'$ $h'$, and thereby establish a circuit from the discharging-main through the magnet of the gas-charge indicator E', as shown by the arrows 7, which magnet, being thus excited, will attract the armature thereof against the counterbalance-weight $s'$, raising the valve $r'$ from the opening in the tube $m'$, and allowing the gas contained in the said tube to escape, and admit the globules $n'$ $o'$ (which had been raised in the tube by the pressure of gas evolved from the plate or plates in the chamber B' when the batteries were fully charged) to descend and make contact with the contact-pieces $p'$ $q'$. The set of batteries attached to switch A will then again come into the charging-circuit. If, however, while this set of batteries is charging, the electro-motive force at the distributing-main falls to the minimum permissible, the lever $g^2$ of the potential indicator $F^2$ will fall, and, completing the circuit indicated by the arrows 2 to the gas-charge indicator E, will actuate its armature and allow the mercury globules $n$ $o$ to fall and the mercury globule $o$ to make contact at $p$ $q$. The circuit of the electro-magnetic device $c$ and the rocking switch A will, however, not be complete, because the magnet of the relay F is holding its armature, and consequently maintaining open the circuit at the contacts $i$ and $k$.

It will be seen from the foregoing description that the sets of batteries respectively in connection with the two rocking switches A and A' are alternately and automatically brought into the circuit of the charging-main to be recharged without interruption of the charging or discharging circuits, and the charging-circuit is prevented from reaching the distributing-main, while at the same time a constant supply of electricity is maintained in the discharging-mains.

Fig. 2 represents a combination of apparatus in which, instead of the gas-charge indicators E E' hereinbefore described with reference to Fig. 1, I employ hydrometers or acidometers, or the like, H H', (which I will refer to as "hydrometers,") the floats $z$ $z'$ of which are elevated more or less, according to the specific gravity of the electrolyte in the cells of the batteries, and I dispense with the indicators $F^2$ $F^3$, hereinbefore described. As the batteries whose cells are represented by H H', respectively, become charged, the density of the exciting-liquid therein increases, and the float consequently tends to rise, the reverse action taking place as the batteries are discharged.

A A' are the two rocking switches, which are similar to those hereinbefore described with reference to Fig. 1, that marked A being represented in the position in which the set of batteries connected therewith is in the discharging-main circuit, and that marked A' being in the position in which the set of batteries connected therewith is in the charging-main.

C C' are respectively the positive lead and the negative lead of the charging-main, and D D' are respectively the positive lead and the negative lead of the discharging or distributing main. The connections of these mains with the switches A A' are the same as described with reference to Fig. 1.

The float of each of the hydrometers H H' is connected by a link, 20, to a double-armed lever, R R', the outer ends of the arms being arranged to dip alternately into two mercury-cups, S P and S' P', according as the hydrometer-float is raised or lowered, the arms being centered to a standard, as shown. The stem of each of the floats passes through a guide, $x^2$ $x^2$, and through a hole in the core of a solenoid, L L', for retaining the float in its elevated position, as hereinafter described.

F F' are two electro-magnets arranged to operate alternately a single armature, $g$, so as to bring it into contact alternately with contact-pieces $i$ $k$ and $i'$ $k'$, for the purpose of maintaining the current in the desired direction while the batteries are in the discharging or charging circuits. Let it be supposed (for example) that the set of batteries in connection with the rocking switch A is at about the predetermined maximum allowable point of exhaustion and the set of batteries in connection with the other switch, A', is about being fully charged, the lever $a'$ of this latter switch maintaining this latter set of batteries in the charging-circuit by a current passing from the distributing-main (as indicated by the arrows 9) through the solenoid L to the electro-magnet C', and then passing by the contacts $i'$ $k'$ to the electro-magnet F', so as to maintain the armature $g$ in the position shown and completing the circuit back to the distributing-main, as shown by the arrows 9. The set of batteries attached to the switch A' is now being charged and the set of batteries attached to the switch A is in the discharging-circuit, and this position is maintained by the action of the solenoid L, which, by the passage of the current around its coils, draws or attracts its core, and so prevents the possible movement of the hydrometer-bulb and stem in the cell H, and however low the discharge of the set of batteries attached to the rocking switch A has proceeded it is impossible for that set of batteries to be removed from the discharging-circuit until the set of batteries attached to the rocking switch A' has been fully charged and the free hydrometer-bulb in the cell H' has risen a sufficient distance to break the circuit at the mercury-cup, as indicated by arrows 9. When, however, the charge of the set of batteries attached to the rocking switch A' is completed, the circuit indicated by the arrows 9 will be broken, as before stated, at the mercury-cup P', the armature $g$ will be released from the magnet F' and will fall back to a neutral position, the armature of the lever $a'$ of the rocking switch A' will be released from the magnet $c'$ under the action of its counterbalance-weight, and the set of batteries will thus be transferred from the charging-circuit to the discharging-main, and at the same time the core of the solenoid L will release the hydrometer-bulb of the cell H, and the said bulb will fall in the liquid, bringing the lever attached thereto into the mercury-cup P. A circuit will now be made in the direction of arrows 10 from a point on the distributing-mains through the magnet F, (thereby attaching the armature $g$,) thence through the electro-magnet or other electric device $c$, for moving the rocker-bar $a$ of the switch A, thence through the solenoid L' and back to the distributing-main. The solenoid L' will attract its core and grip the stem of the hydrometer-bulb of the cell H', thus maintaining the battery attached to the rocking switch A' in the distributing-main. The charge of the set of batteries attached to rocking switch A will now proceed, and the hydrometer bulb and stem attached to the cell H will accordingly commence to rise when the charge to this set of batteries is completed, the circuit indicated by arrows 10 will be broken at the mercury-cup P of the cell H, and the magnet F will release its armature $g$, which will then fall to the neutral position. The electro-magnet device $i$ will release the lever $a$, and the set of batteries connected with the switch A will be thus transferred by the movement of the lever $a$ into the circuit of the distributing-main. Both sets of batteries will now be supplying current to the distributing-main and the levers R R' will have their ends in contact with the mercury-cups S S'. A current will then pass from the distributing-main at the switch A, as shown by the arrows 10, along the lever R, through the mercury-cup at S, thence, as indicated by arrows 11, to the by-pass magnet T, and through the mercury-cup S' back to the opposite pole of the distributing-main, as shown by the arrows 9. The magnet or solenoid T, being thus excited, will attract its armature and cause its end $t$ to make contact with the mercury-cup $t'$, and on the completion of the stroke of the armature the carbon end $u$ thereof will make contact with a carbon block at G², thus connecting the charging-main C C' (in like manner to that described with reference to Fig. 1) first through a resistance and afterward short-circuiting that resistance and maintaining the continuity of the charging-circuit. When one of the sets of batteries attached to the rocking switches A A' has become exhausted to the predetermined limit, the hydrometer-bulb in connection with that set of batteries will fall and cause the lever connected therewith to be inserted in the mercury-cup P or P', as the case may be, and the circuit will then be completed, as before described, and effect the locking of the other set of batteries in the position required by the maintenance of one set of batteries in the circuit of the discharging-main, and the before-mentioned operation will be repeated.

Having now particularly described and ascertained the nature of my said invention and in what manner the same is to be performed, I declare that what I claim is—

1. The combination of two or more secondary batteries or sets of secondary batteries, a charging-circuit, a distributing-circuit, switches—one for each battery or set of batteries—for transferring the same from one circuit to the other, magnets for operating said switches, and means, as indicated, for opening and closing the circuits of said magnets at the proper times, substantially as described.

2. The combination of two or more secondary batteries or sets of batteries, a charging-circuit, a distributing-circuit, switches for transferring said batteries from one circuit to the other, electro-magnets for operating said switches, and charge indicators or devices for operating contacts in the circuits of the switch-magnets when the batteries are fully charged or discharged, substantially as described.

3. The combination, with two or more secondary batteries or sets of batteries and electro-magnetic switch mechanism therefor, of a gas-charge indicator comprising a tube connected with a cell of said battery and a globule or cylinder of mercury normally closing contacts in the circuit of the switch-magnet, but adapted by the pressure of gas in said tube to break said circuit, substantially as described.

4. The combination, with two or more secondary batteries or sets of secondary batteries, a charging and a distributing circuit, electro-magnetic switch mechanism for transferring the batteries from one circuit to the other, and means for automatically opening and closing the circuits of the switch-magnets, of relays and their magnets, each relay controlling contacts in the circuit of its own switch-magnet, and each relay-magnet being included in the circuit of the other switch-magnet, substantially as described, so that both batteries or sets of batteries cannot at the same time be connected in the charging-circuit.

5. In apparatus for alternately and automatically charging two or more secondary batteries or sets of secondary batteries, the combination of a by-pass relay and resistance in connection with the charging-main and the relays F F' and their contacts $i\ i'$, substantially as and for the purpose hereinbefore described with reference to the accompanying drawings.

6. In apparatus for automatically discharging one or both of two or more secondary batteries or sets of secondary batteries, the combination of rocking switches A A', charge-indicators E E', potential indicators $F^2$ $F^3$, relay magnets and contacts F F', and the circuits connecting the same, substantially as hereinbefore described, and illustrated by the accompanying drawings.

In testimony whereof I have signed my name to this specification in the presence of two subscribing witnesses.

FRANK KING.

Witnesses:
 HENRY G. FREEMAN,
 C. W. NEWTON,
  *Both of 9 Birchin Lane.*